(12) United States Patent
Østergaard et al.

(10) Patent No.: US 10,159,259 B2
(45) Date of Patent: Dec. 25, 2018

(54) METHOD AND AN APPARATUS FOR ARRANGING A BIRD IN A POSITION FOR BEING SUSPENDED FROM A SHACKLE

(71) Applicant: LINCO FOOD SYSTEMS A/S, Trige (DK)

(72) Inventors: Bent Østergaard, Svenstrup (DK); Lasse Markfoged Petersen, Aarhus C (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 15/307,823

(22) PCT Filed: Apr. 27, 2015

(86) PCT No.: PCT/DK2015/050106
§ 371 (c)(1),
(2) Date: Oct. 30, 2016

(87) PCT Pub. No.: WO2015/165470
PCT Pub. Date: Nov. 5, 2015

(65) Prior Publication Data
US 2017/0049117 A1    Feb. 23, 2017

(30) Foreign Application Priority Data
Apr. 30, 2014    (DK) .................................. 2014 70266

(51) Int. Cl.
*A22C 21/00*    (2006.01)
(52) U.S. Cl.
CPC ................................ *A22C 21/0053* (2013.01)
(58) Field of Classification Search
CPC . A22C 21/00; A22C 21/0007; A22C 21/0046; A22C 21/02; A22C 21/0053; A22C 21/0015; A22C 21/0038
(Continued)

(56) References Cited

U.S. PATENT DOCUMENTS 3,643,293 A     2/1972  Rejsa et al.
3,990,400 A *  11/1976  Shreckhise .......... A01K 31/002
                                                    119/494
(Continued)

FOREIGN PATENT DOCUMENTS

AU        1460783 B     12/1983
CN      101005763 A      7/2007
(Continued)

OTHER PUBLICATIONS

International Search Report for PCT/DK2015/050106, dated Jun. 30, 2015.
(Continued)

*Primary Examiner* — Richard T Price, Jr.
(74) *Attorney, Agent, or Firm* — FisherBroyles, LLP; Robert Kinberg

(57) ABSTRACT

The invention relates to a method and an apparatus for arranging a bird having a body and two legs in a position for being suspended from a shackle. The method comprises the following sequence of steps: I) placing the body of the bird on a support surface with the breast side facing the support surface, II) inserting at least one spreading member between the legs of the bird, so that the breast side of at least one leg comes to rest on a contact surface of the spreading member, and III) forcing the legs away from each other using the spreading mechanism, so that the distance between the hock joints becomes bigger than the distance between the hip joints.

10 Claims, 10 Drawing Sheets

(58) Field of Classification Search
USPC ........ 452/177, 178, 179, 182–184, 157, 158
See application file for complete search history.

(56) References Cited

U.S. PATENT DOCUMENTS

| | | | | |
|---|---|---|---|---|
| 4,570,295 | A | 2/1986 | van Mil | |
| 5,913,286 | A * | 6/1999 | Showalter | A01K 45/005 119/843 |
| 6,109,215 | A * | 8/2000 | Jerome | A01K 45/005 119/843 |
| 6,612,918 | B2 * | 9/2003 | Livingston | A01K 45/005 119/846 |
| 6,694,498 | B2 * | 2/2004 | Conrad | G03F 7/70633 716/52 |
| 6,694,918 | B2 * | 2/2004 | Draft | A01K 31/002 119/400 |
| 7,004,830 | B2 * | 2/2006 | van der Steen | A22C 21/0023 452/185 |
| 7,134,956 | B2 * | 11/2006 | Lee | A22C 21/0007 452/53 |
| 7,389,745 | B2 * | 6/2008 | Weaver | A01K 31/07 119/440 |
| 7,597,615 | B2 * | 10/2009 | van den Nieuwelaar | A22B 3/005 452/182 |
| 7,837,540 | B2 * | 11/2010 | van den Nieuwelaar | A22C 21/0046 452/177 |
| 8,105,138 | B2 * | 1/2012 | Van Den Nieuwelaar | A22C 21/0038 452/177 |
| 8,176,879 | B1 * | 5/2012 | Anderson | A01K 45/005 119/846 |
| 8,814,636 | B2 * | 8/2014 | Van Stuijvenberg | A22B 3/06 452/58 |
| 8,968,060 | B2 * | 3/2015 | Harben, III | A22C 21/0007 452/180 |
| 2008/0242208 | A1 | 10/2008 | van den Nieuwelaar et al. | |
| 2011/0136422 | A1 | 6/2011 | McMurray et al. | |

FOREIGN PATENT DOCUMENTS

| | | |
|---|---|---|
| CN | 103228144 A | 7/2013 |
| CN | 102292048 B | 6/2015 |
| DE | 3048342 A1 | 7/1982 |
| EP | 1143803 B1 | 9/2006 |
| EP | 1848282 B1 | 2/2009 |
| WO | 00/18245 A1 | 4/2000 |
| WO | 2011/116774 A1 | 9/2011 |
| WO | 2013/003829 A2 | 1/2013 |
| WO | 2014/026695 A1 | 2/2014 |
| WO | 2014/040604 A1 | 3/2014 |

OTHER PUBLICATIONS

Written Opinion for PCT/DK2015/050106, dated Jun. 30, 2015.
Office Action dated Apr. 19, 2018, in Chinese Patent Application No. 201580025566.2 (submitted with English translation).

* cited by examiner

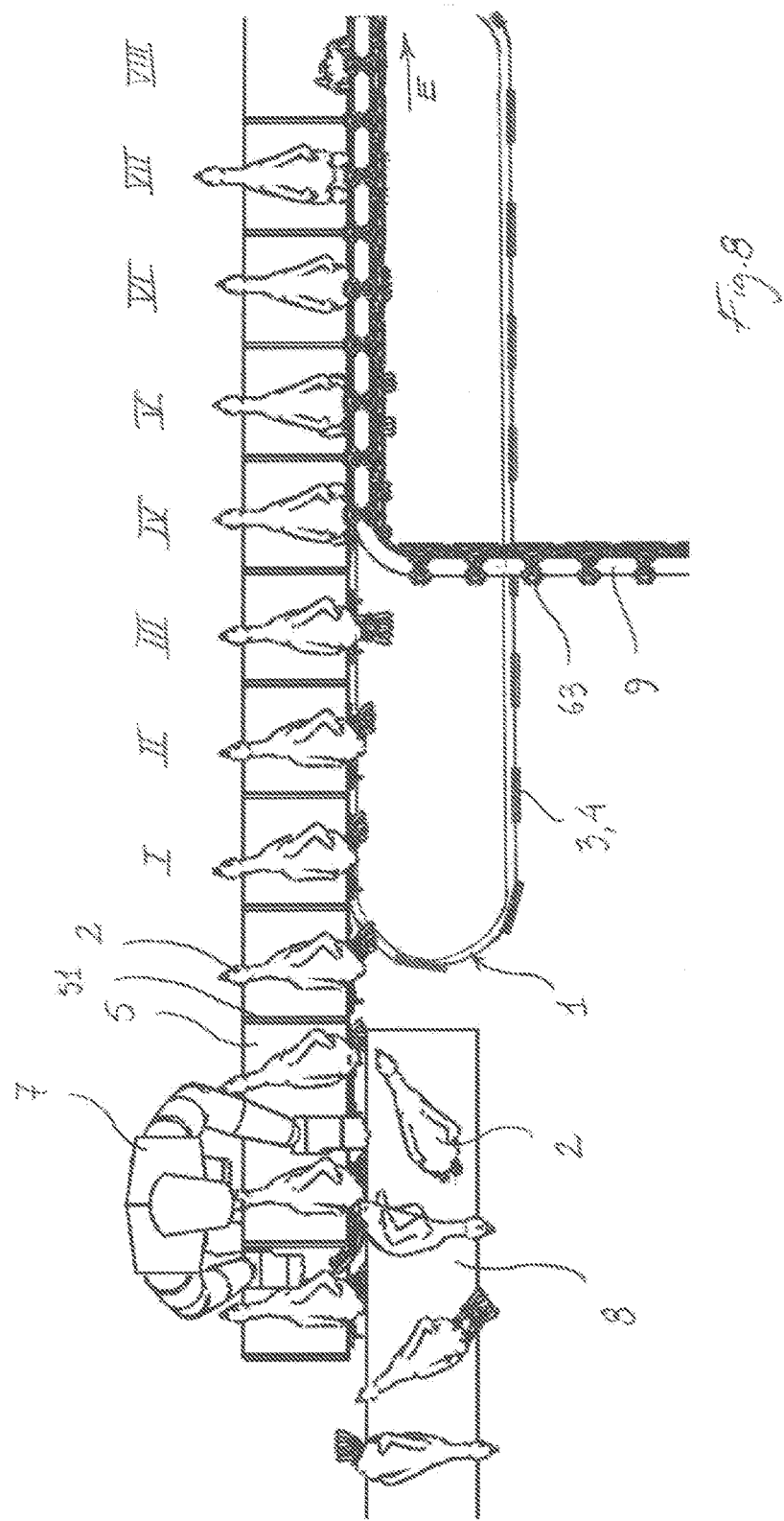

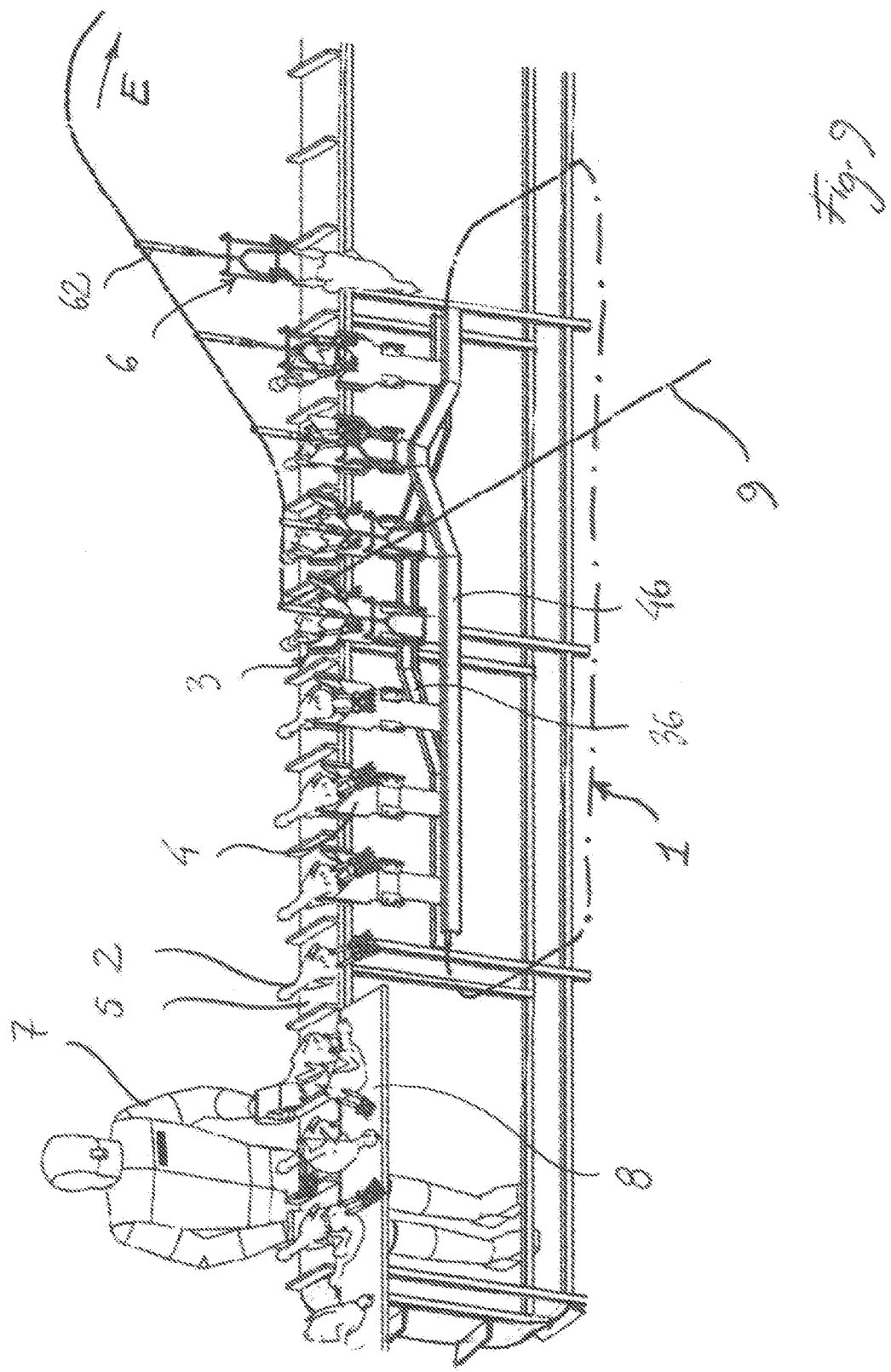

METHOD AND AN APPARATUS FOR ARRANGING A BIRD IN A POSITION FOR BEING SUSPENDED FROM A SHACKLE

BACKGROUND OF THE INVENTION

The present invention relates to a method of arranging a bird having a body and two legs in a position for being suspended from a shackle, the body having a breast and a back and each leg comprising a breast side, a back side, a thigh connected to the body at a hip joint, a drumstick connected to the thigh, a shank connected to the drumstick at a hock joint and a foot with digits, where the body of the bird is placed on a support surface with the breast side facing the support surface. The invention also relates to an apparatus for arranging a bird in a position for being suspended from a shackle.

In most bird slaughterhouses, particularly poultry slaughterhouses, the birds to be slaughtered are suspended from slaughter shackles on an overhead conveyor before being killed and plucked. Suspending the birds manually is a heavy and monotonous work and it is therefore desired to provide a reliable automation of the process. In order to achieve this, the birds must be arranged in a position for being suspended.

DE3048342A1 described a method where each bird is arranged in an individual tray with the legs projecting over the tray edge before being brought into engagement with the shackle. This method and the tray system used is structurally very simple, but suffers from the disadvantage that the bird tends to roll over to one side due to the curvature of the breast and that the shackle may then not catch the bird correctly.

In WO 00/18245 each bird is instead arranged on a so-called fit piece, which matches the shape of the breast or back side of the bird. In modern poultry slaughterhouses running at very high processing speeds it is, however, not possible for the operators arranging the birds on the fit pieces to position all birds optimally and some birds are therefore not caught correctly by the shackles.

In WO 2011/116774 the legs of each bird are arranged with the shanks locked in retainer clips in order to provide a precise positioning of the bird, but this still requires a manual handling of the birds and in some cases the bird is held too tightly to be released properly from the clips.

A fully automated positioning of birds is known from the applicant's prior patent application PCT/DK2013/050294, where each bird is arranged in a concave holder, which is then rotated until the legs of the bird are in the correct position for being transferred to the shackle. This method is highly reliable and efficient, but due to its technical complexity also relatively expensive.

SUMMARY OF THE INVENTION

It is therefore the object of the invention to provide an alternative method for positioning birds, which can be at least partially automated and provides a relatively low error rate.

This is achieved with a method where at least one spreading member of a spreading mechanism is inserted between the legs of the bird, so that the breast side of at least one leg comes to rest on a contact surface of the spreading member, and where the legs are forced away from each other using the spreading mechanism, so that the distance between the hock joints becomes bigger than the distance between the hip joints in a direction perpendicular to the length direction of both legs.

If a bird is not lying correctly with its spine directly above the keel bone, i.e. having rolled over on one side, one leg will be located closer to the support surface than the other and the spreading member will therefore usually come into contact with this leg first. When the legs are subsequently forced away from each other the lowermost leg will be forced outwards towards the intended position and eventually cause the entire body of the bird to rotate at least until the other leg comes into engagement with the spreading mechanism. Spreading the legs, so that the distance between the hock joints becomes bigger than the natural distance between the hip joints, results in that the legs will provide a force in the opposite direction of the force applied by the spreading mechanism. Due to the nature of the joints of the legs, this force of the legs will contribute to pulling the body into position, thus ensuring that not only the legs but the entire bird is positioned correctly.

The invention will be described with reference to embodiments, where the spreading member(s) is/are inserted from the breast side, but it will be understood that insertion from the back side is also possible and within the scope of the invention.

The spreading member(s) preferably engage the drumstick(s) or hock joint(s). In chicken and other gallinaceous birds the hock joint forms an inward bent on the leg when seen from the breast side. When using a contact surface of a limited extend, typically 0.5-3 cm in the length direction of the legs of the bird, this will normally result in the hock joint or the section of the shank closest to the hock joint coming to ride over the contact surface at the end of the spreading sequence where the legs are furthest apart. This provides a precise and stabile positioning and leaves the shanks free for insertion into a shackle.

The support surface may be part of an apparatus used for positing the bird, but may also advantageously be part of a conveyor passing by the apparatus or other separate unit arranged closely adjacent to the positioning apparatus. It is presently preferred that the apparatus for arranging the bird in position is provided with a plurality of separating mechanisms each adapted for handling a single bird at a time and adapted for moving in parallel with a conveyor serving as support surface for the birds, the conveyor possibly being divided into a plurality of sections each adapted for supporting a single bird. The positioning of the bird may then be performed while the spreading mechanism travels alongside the support surface on the conveyor as will be explained in detail later, possibly using the movement of the conveyor and/or spreading mechanism for activating the spreading member(s). In the same way a shackle conveyor may run in parallel with the spreading mechanism of the apparatus for bringing each bird into engagement with a shackle as will also be explained later.

In order to allow the body of the bird to rotate to the correct position, it is preferred that the contact between the spreading member(s) and the leg(s) causes the body of the bird to be lifted from the support surface. This implies that legs are turned at the hip joint so that the thighs are pushed as far towards the back side as possible, thereby reaching a stabile and well-defined position. Moreover, friction between the bird and the support surface is minimized.

A single spreading member may suffice for positioning each bird, but in a more complex embodiment two spreading members each including a contact surface adapted for contact with one leg of the bird are moved away from each other, thereby forcing the legs away from each other. For this purpose the spreading mechanism comprises an activation mechanism adapted for moving the two spreading members away from each other so as to force the legs of the bird away from each other. The two spreading members are preferably inserted between the legs of the bird as a unit, but it will also be possible to insert them one by one, either inserting one fully before inserting the other or keeping one in front of the other during the insertion and/or inserting them at a different speed.

The use of a single spreading member provides a structurally simple solution, which is relatively easy to maintain and clean, whereas the use of two spreading members provides for at more precise control. When using a single spreading member, the legs of the bird will slide over the contact surface during the spreading process, while they may be kept more or less stationary on the respective contact surfaces of the separate spreading members. The use of two spreading members may thus reduce friction between the legs of the bird and spreading mechanism. In order to minimize the risk of damages to the birds, the spreading mechanism may be provided with force sensors or elastic suspensions of the spreading members allowing the force applied to the legs to be controlled.

A spreading member may comprise a tapering section, the narrow end of the tapering section being adapted for being inserted first between the legs of the bird, so that the legs are gradually forced away from each other as the spreading member(s) advance(s).

In order to allow the bird to become positioned with a minimum of friction, the leg(s) are preferably resting loosely on the contact surface(s), but stops may be provided for keeping the legs from coming off the contact surface(s) at the sides. This may for example be achieved by using a contact surface having the shape of the letter W or a combination of contact surfaces together forming this shape. The central peak of the W will then enter between the legs, while the outer arms will prevent the legs from coming too far apart, the legs being positioned in the valleys formed by the downwards points of the W.

Embodiments where the legs are fixated in relation to the spreading member(s) and/or restrictor member(s) are also possible, including embodiments where one or more fixation members is/are used to keep the leg(s) against the spreading member(s) and/or restrictor member(s) during the positioning process. In one such embodiment a fixation member is arranged closely above the spreading member(s) and/or restrictor member(s), leaving only one or two narrow openings through which the legs of the bird projects. At present it is preferred that there is no or limited contact between any fixation member(s) and the leg(s) in order to minimize the risk of damages to the legs, particularly caused by friction, but a tight fixation of the legs is within the scope of the invention.

Shackles are usually provided with leg receiving openings at a distance corresponding substantially to the distance naturally occurring between the hock joints and in order to facilitate transfer to a shackle the method may further comprising the step of moving the legs back towards each other after having been spread. This may be achieved simply by releasing the legs and/or spreading members or by forcing the legs back together using a restrictor member or mechanism adapted for moving the legs back towards each other after having been spread. The restrictor member may for example have a tapering recess and be connected to an activation mechanism adapted for advancing the restrictor member towards the legs of the bird so that the legs are forced into the recess and thus gradually towards each other. As describe for the spreading members above, two or more restrictor members may be included in a restrictor mechanism and such restrictor members preferably engage the legs of the bird synchronously. It is, however, also possible to simply move the spreading member(s) back towards the initial position.

The spreading member(s) and/or the restrictor member(s) may be plate shaped or made from bend rod, both of which provides for structurally simple and reliable designs. They are preferably made from stainless steel, which is durable and easy to keep clean, but other materials such as metals, polymers or composites may also be used.

The method according to the invention may be used regardless of the state of the bird, but from an animal welfare perspective it is preferred that the bird is stunned or killed prior to the positioning process. This will also facilitate handling if the bird is arranged manually on the support surface.

Once the bird is positioned as described above the legs can be inserted through one or more openings in the shackle by a relative movement between the shackle and the spreading mechanism and/or restrictor member, and then lifted or pulled away from the support surface. This is preferably done by moving the shackle upwards past the spreading mechanism and/or restrictor member, but other patterns of movement may be more expedient depending for example on the design of the shackle, including a lowering of the support surface, spreading member(s) and/or restrictor member(s).

If the support surface is concave or otherwise shaped to prevent the bird from rolling over once positioned, the bird may be released from the spreading member(s) and/or restrictor member(s) before being brought into engagement with the shackle, but it is presently considered advantageous to keep it in engagement with at least one of them until shackled.

It is also possible to fixate the body and/or legs of the bird once positioned in order to the ease the transfer to the shackle, possibly bending the legs at the hock joint as described in WO2014/026695 so that the foot comes nearer to the breast of the bird and the digits of the foot move closer to each other in order to ease insertion of the feet into the shackle.

BRIEF DESCRIPTION OF THE DRAWINGS

In the following, the invention will be described in further detail with reference to the schematic drawing, where:

FIG. 7 shows a perspective view of a conveyor including several support surfaces each carrying a chicken, a series of spreading mechanisms of the type shown in FIGS. 1-4 and shackles for receiving the chicken, FIG. 8 corresponds to FIG. 7 but seen from above and showing also an operator moving birds from a feed conveyor to the support surface conveyor, outlines of a spreading mechanism conveyor and a shackle conveyor, FIG. 9 corresponds to FIG. 8 but shown in a perspective view and showing also guide tracks for controlling the spreading and restrictor members.

DETAILED DESCRIPTION OF THE INVENTION

Figure 1:
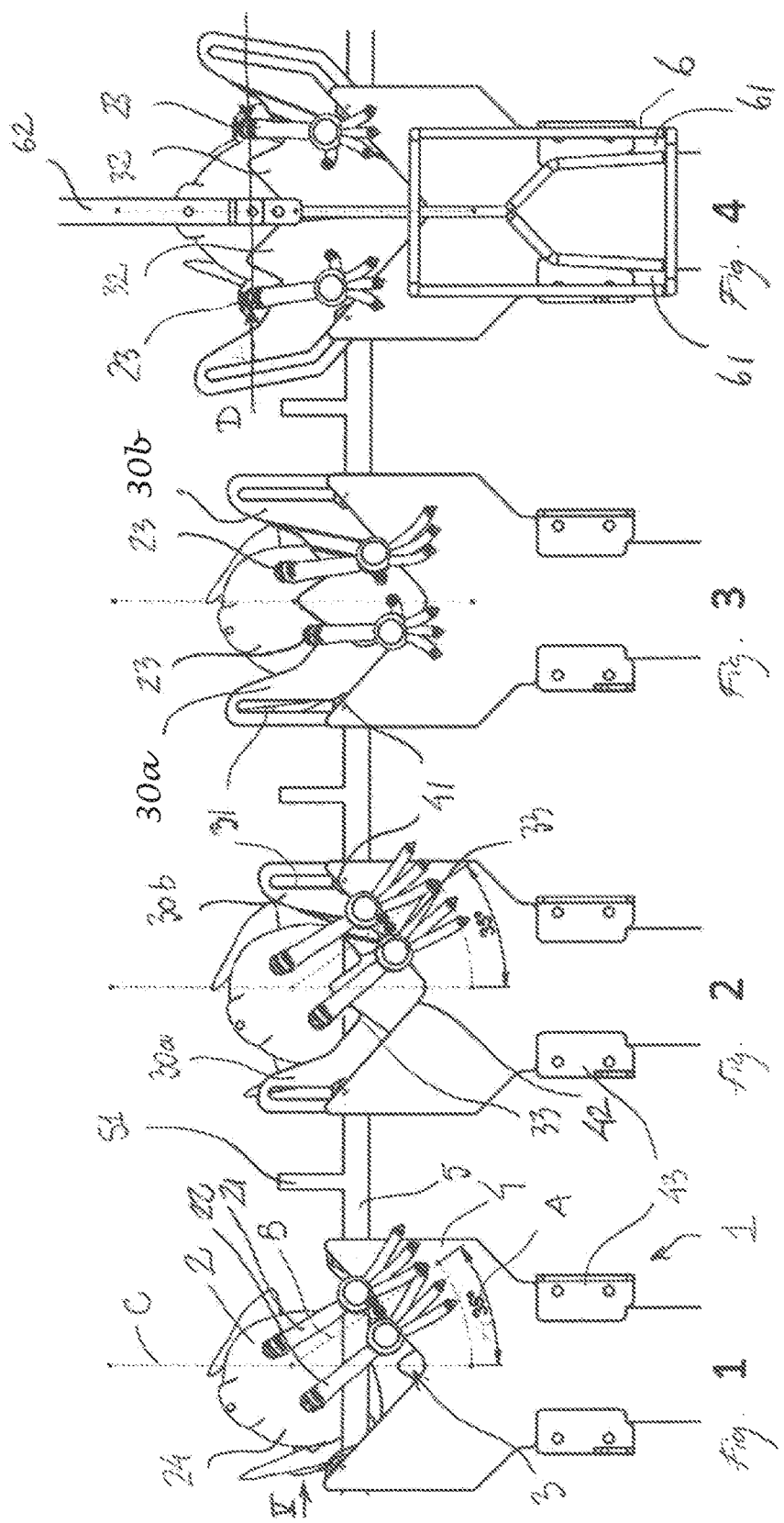
FIG. 1 is a sketch of a chicken lying on a support surface and a spreading mechanism seen from the side, FIGS. 2-4 correspond to FIG. 1 but showing different stages of operation of the spreading mechanism, FIG. 4 also showing a shackle, FIG. 5 corresponds to FIG. 1 but seen from another side as indicated by the arrow V in FIG. 1 and showing the chicken in a slightly less tilted position, FIG. 6 corresponds to FIG. 3 but seen from the same side as in FIG. 5.

An apparatus 1 for arranging a bird 2 in a position for being suspended from a shackle is shown in FIG. 1-9. This apparatus comprises a spreading mechanism 3 including two spreading members 30a, 30b, which are almost entirely hidden behind a cover member 4 in FIG. 1. As may be seen by comparing FIGS. 1-4, the spreading members are moveable from the passive position in FIG. 1 via the positions in FIGS. 2 and 3 to an extended and spread out position in FIG. 4, where the spreading members have been moved upwards in relation to the cover member and away from a centre plane C in opposite directions.

In this embodiment, the movement of the spreading members 30a, 30b is controlled by guide tracks 31 in the spreading members sliding over guide projections 41 on the cover member so that the intended pattern of movement results from a simple upwards push on the lowermost parts of the spreading members as will be described later.

As may also be seen by comparing FIGS. 1-4, the cover member 4 remains at the same height relative to the support surface 5 supporting the chicken 2, whereas the spreading member is elevated, but it is entirely within the scope of the invention to lower the support surface and/or the cover member during operation of the apparatus. Other patterns of movement providing the relative change of position between the spreading members, support surface and cover member are also possible.

Figure 2:
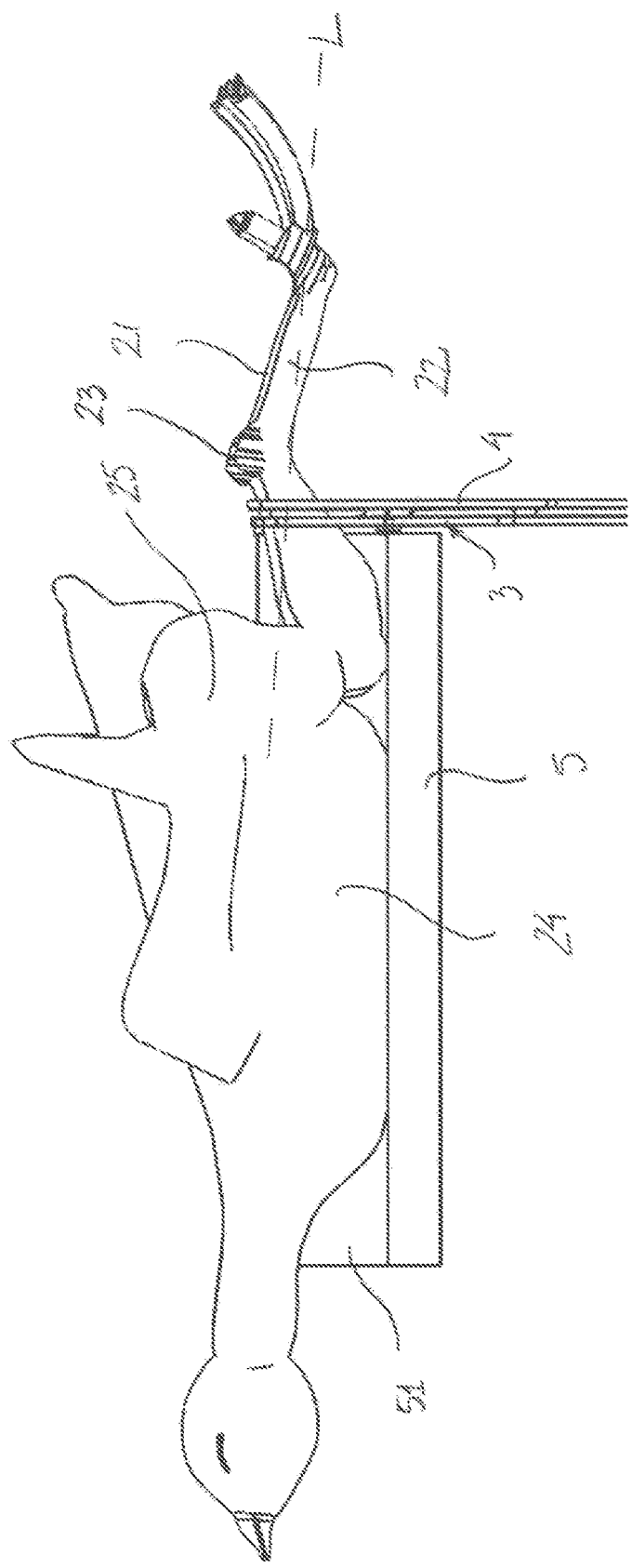

In FIG. 1, the chicken 2 is lying on the support surface 5 with the breast facing downwards, but tilted to the left so that there is an angle A of approximately 35 degrees between the centre plane C of the apparatus and a plane B extending through the spine and keel bone of the chicken, i.e. the plane of symmetry of the bird. Such a tilting is very common when a bird is arranged on a flat support surface due to the natural curvature of the breast of the bird and in the tilted orientation gravity may force the foot of the uppermost leg 21 to rest against the foot of the lowermost leg 22 as shown in FIGS. 1 and 2. The combination of the feet being close together and the legs having an inclined orientation makes it difficult to automatically insert the legs in a shackle 6 of the type shown in FIG. 4, this type being very commonly used in poultry slaughterhouses.

Figure 3:
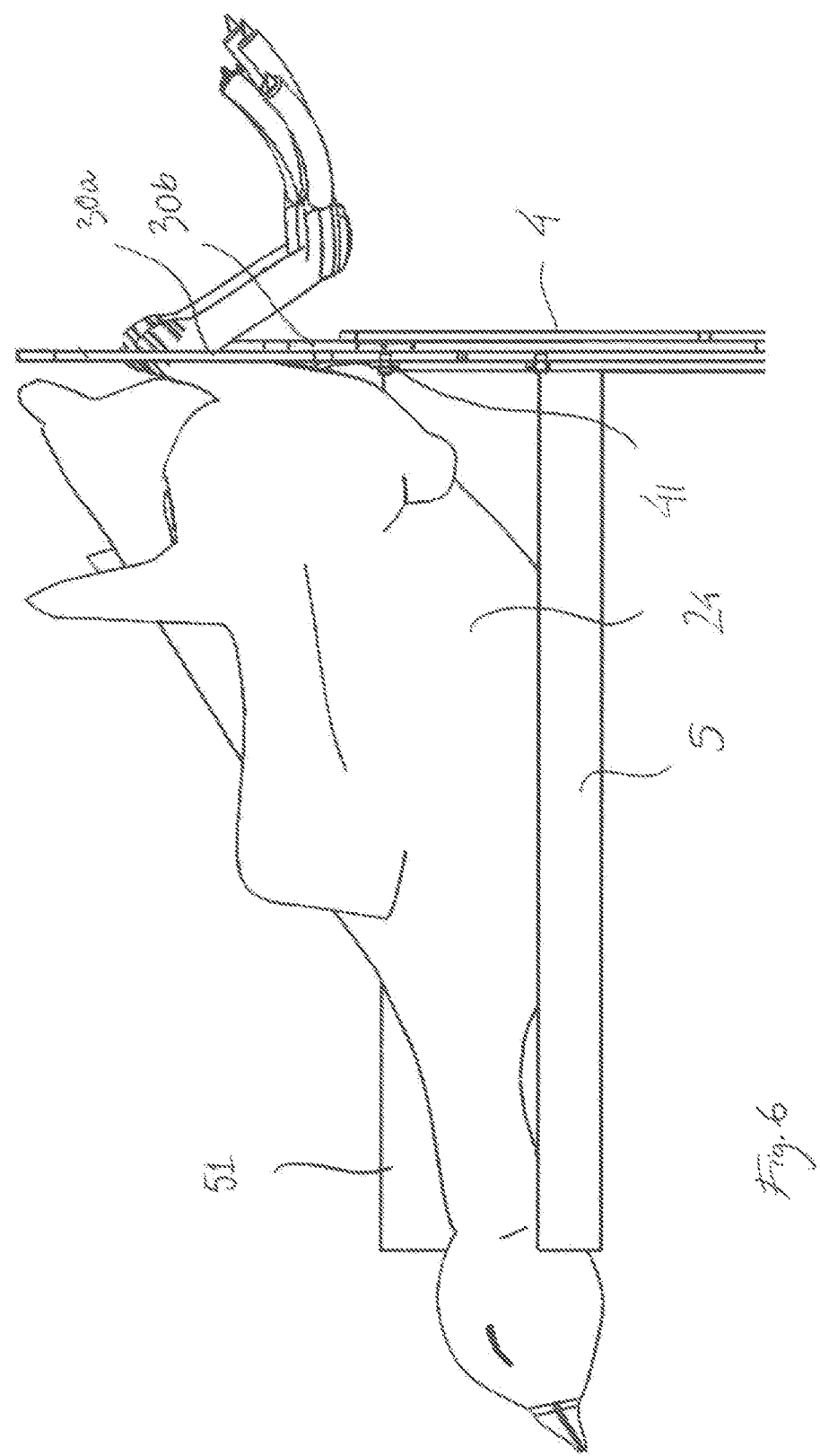

When advancing the spreading members as shown in FIGS. 2 and 3, the tapering section 32 here formed by triangular projections of both spreading members 30a, 30b will gradually be inserted between the legs 21, 22 and eventually a contact surface of one of the spreading members, here the one to the left, comes into contact with of the lowermost leg 22. Further advancement of the spreading members, which are here moved synchronously upwards as were they a single member, causes the spreading member to push on the breast side of the lowermost leg thereby lifting the body 24 of the bird from the support surface as also seen in FIG. 6. This causes the entire bird to rotate under the influence of gravity until both legs are in contact with the spreading members.

In this embodiment the spreading members 30a, 30b together have the shape of a W forming two hollows 33 in the contact surface, one on either side of the tapering section 32. When the spreading members come into contact with the legs 21, 22, the legs will gradually slide into the hollows and, as seen in FIGS. 5 and 6, the legs will eventually come to ride with the hock joints 23 over these hollows 33 in the spreading members. The outer parts of the spreading members serve as stops keeping the legs from coming off the contact surface, which may particularly relevant at very high processing speeds.

During the sideways movement of the spreading members, the legs, which are resting loosely on the contact surfaces once in contact therewith, will slide and/or rotate the contact surface until they are resting substantially symmetrically on the contact surfaces of the respective spreading members and the centre plane B of the body is substantially vertical.

Figure 4:
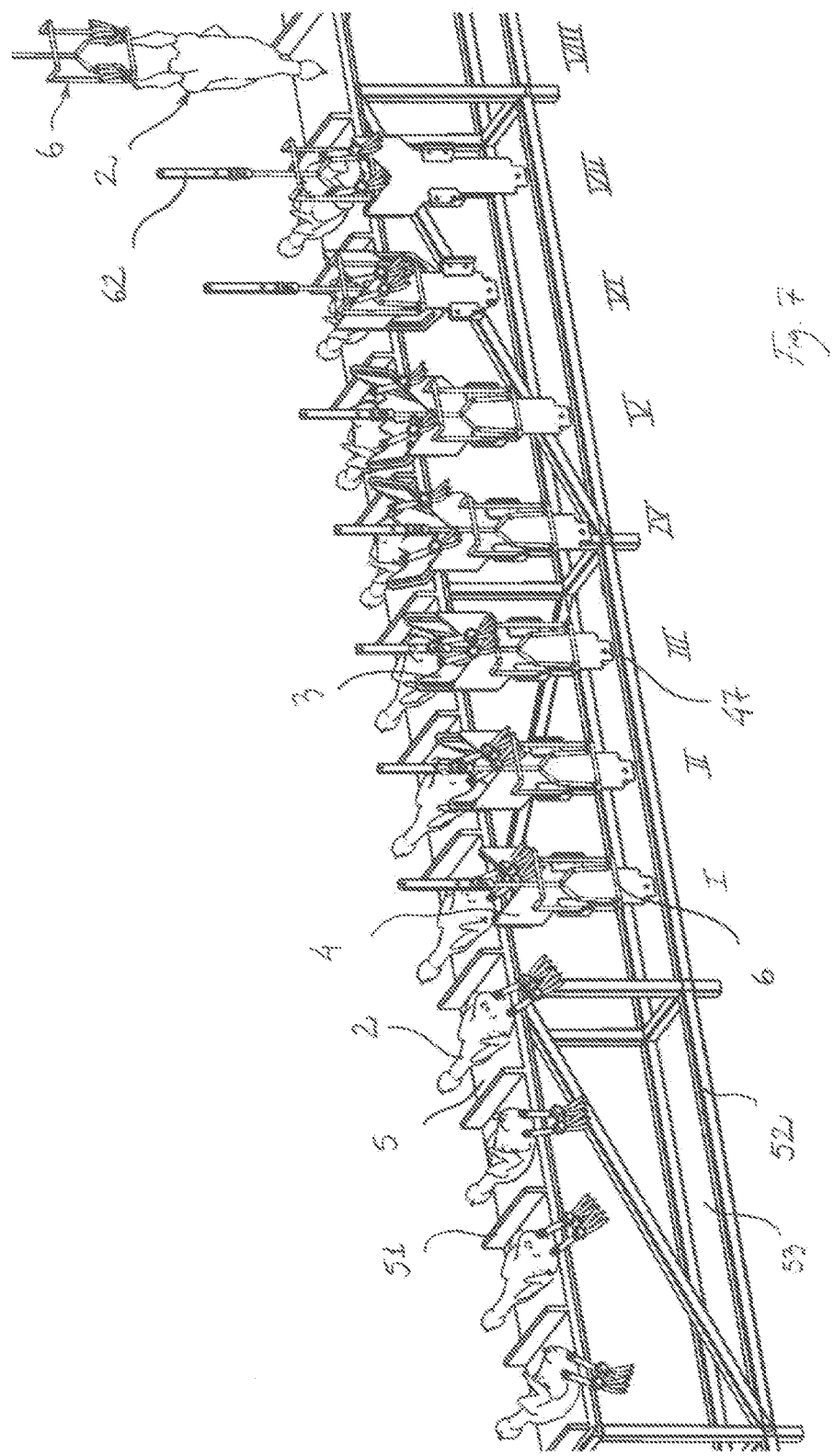

In some cases the lifting of the body 24 from the support surfaces may be sufficient to achieve a satisfactory positioning of the bird, but particularly when processing heavy birds the natural flexibility of the leg joints of the bird, i.e. the hip joint, the knee joint and the hock joint sets a limit to the rotation of the body which can be achieved in this way. The spreading mechanism is therefore adapted for forcing the legs away from each other in a direction perpendicular to the length axes L of the legs, so that the distance D between the hock joints 23 becomes bigger than the distance between the hip joints 25 as shown in FIG. 4 corresponding to stage IV in FIGS. 7 and 8. This brings the joints to their extremes and forces the body to rotate. In this respect it is noted that the apparatus should either be designed in accordance with the size of birds to be processed and/or provided with a safety mechanism preventing excessive spreading of the legs which might cause damages to the birds, such as displacement of the hip joints. Such a safety mechanism may for example be a dynamometer, which measures the resistance of the legs, so that the spreading of the legs can be stopped when reaching a predefined upper force limit.

As may be seen by comparing FIGS. 3 and 4, the distance between the openings 61 in the shackle 6 adapted for receiving the legs of the bird is only slightly larger than the natural distance between the hock joints 23 and it is therefore considered advantageous to bring the legs 21, 22 at least partially back together before insertion in the shackle. This may be achieved by moving the spreading members 30a, 30b back towards the centre plane C, but it is also possible to use the cover member 4 as a restrictor member by raising it so that the V-shaped recess 42 therein catches the legs and forces them together as illustrated in stage VI of FIGS. 7 and 8. If, at the same time, raising the shackle 6 as also illustrated in FIG. 7 and then lowering the cover member 4, the legs of the bird is automatically brought into the shackle and the bird can then be lifted from the support surface as shown in stage VIII on FIG. 7. Guide members 43 are provided for guiding the movement of the cover member 4 when serving as a restrictor member as will be explained in further detail below.

In the embodiment shown in FIGS. 1-9, the birds are resting on a belt conveyor having a plurality of support surfaces 5 separated by upstanding flanges 51 and running over a frame structure 52 with a return run 53 of the belt on the underside of the frame structure. It is, however, also possible to use a simpler belt conveyor without separations or a more complex conveyor with separate carrier units serving as support surfaces for individual birds, for example by providing a series of trays joint to each other in a flexible manner, e.g. with hinges.

A belt conveyor may be made from sheet material or interconnected modules and from any material suitable for contact with food items and resistant to thorough cleaning, such as metals and polymers. Similar considerations apply to separate carrier units, examples of which will be described below.

The arrangement of the birds on the support surface conveyor or carrier units may be performed manually as shown in FIGS. 8 and 9, where a human operator 7 pulls each bird from a feed conveyor 8 onto a support surface 5, but this process may also be automated. Regardless of the method used, the birds must be arranged with the heads in the same direction, i.e. pointing away from the positioning apparatus 1, and resting on the breast side. It will usually be possible to achieve a shackling of the bird even if accidentally arranged on its back, but the positioning will be less precise and the resulting mirror-inverted shackling may cause problems with respect to other processes on the slaughter line.

In this embodiment of the apparatus 1, the spreading mechanisms 3 and associated cover members and/or restrictor members 4, are mounted on a conveyor following an endless oval path in a horizontal plane, so that the spreading mechanisms travel alongside the support surface conveyor while passing the positions marked I-VIII in FIGS. 7 and 8. In this way the birds can be positioned as they travel forward on the support surface conveyor, allowing a high speed processing of a large number of birds per hour, but it is also possible to use only a single stationary spreading mechanism. This applies regardless of the type of support surface and of the type of spreading mechanism used.

In FIGS. 8 and 9, the shackles 6 are hanging from a shackle conveyor 9 arranged underneath the ceiling of the slaughterhouse, each shackle being connected to the conveyor by link arms 62 and attachment members 63 in a manner well known to the skilled person. In this embodiment, the distance between the shackles attachment members 63 and hence the shackles 6 hanging from them is half the distance between the birds on the support conveyor and the spreading mechanisms 3 of the positioning apparatus 1. It is the intention that every other shackle is filled using the positioning apparatus 1 shown, while the remaining shackles are filled by a second subsequent positioning apparatus (not shown). It is, however, also possible to have the same distance between the support surfaces 5, the spreading mechanisms 3 and the shackles 6.

It is to be understood that the shackle conveyor 9 is an endless conveyor continuing as indicated by the arrows E to at least one other processing station in the slaughter house, typically a scalding station (not shown) and that it is a continuous conveyor following an endless path. It is also to be understood that the shackle conveyor as well as the support surface conveyor and apparatus conveyor may follow different paths than those illustrated, depending for example of the space available in the slaughter house.

As seen in FIG. 9, the positioning apparatus 1 here further includes a pair of guide rails 36, 46 extending on either side of the conveyor of the positioning apparatus and suitable for interaction with the lower ends of the spreading mechanisms 3 and the cover members 4, respectively. As may be seen in FIG. 7, each cover member comprises a guide member 47 on the outer side facing the guide rail 46. When a spreading member and its associated cover member is moved forward by the apparatus conveyor and reaches the guide rails, the guide member 47 on the cover member enters into a track in the guide rail 46 and a corresponding guide member (not shown) on the spreading mechanism 3 enters into a track in the guide rail 36. When continuing forward, the respective guide members follows the paths defined by the guide rails causing first an activation of the spreading mechanism controlled by guide tracks 31 in the spreading members 30a, 30b and later a raising of the cover member as described with reference to FIGS. 1-4.

A similar controlling of the spreading mechanism and/or cover member may be achieved by direct inaction with the guide rails without attached guide members or by the rail(s) projecting into recesses in the spreading mechanism and cover member. Likewise it will be understood that the controlling of the spreading mechanism and/or cover member functioning as restrictor member may be achieved in completely different ways, including the use of a separate motor on each mechanism.

FIGS. 10-15 show another embodiment of the spreading mechanism and support surface. In these figures, the same reference numbers as in FIGS. 1-9 have been used and it is to be understood that if nothing else is stated features having the same reference numbers have the same function. It is also to be understood that the arrangement of the different conveyors etc. and possible alternatives described with reference to FIGS. 7-9 also applies to this embodiment.

Figure 10:
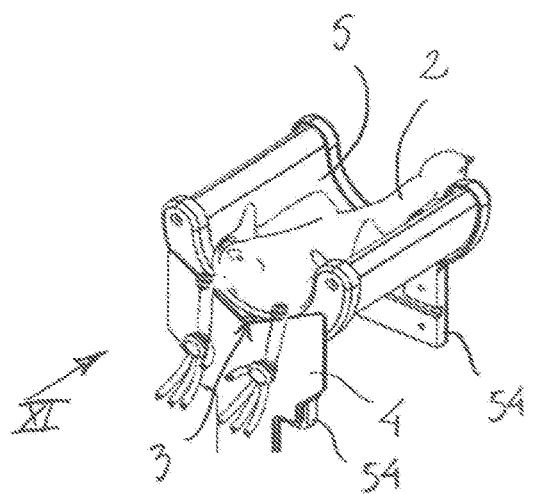
FIG. 10 shows another embodiment of the support surface and spreading mechanism in a perspective view.

As seen in FIG. 10, the bird 2 is here arranged on a cradle-shaped support surface 5, here formed by an endless belt arranged between two base members 54 on two rollers (not visible) attached to the base members at axes 55. When the rollers are free to turn, the belt may follow the rotation of the bird caused by the spreading mechanism as described above, thus minimizing friction between the bird and the support surface. The concave shape of the support surface will contribute to keeping the bird from rolling over again once positioned. With a certain resistance against rotation of the rollers, caused for example by friction, the positioning may be maintained without additional means until the bird has been shackled, but it is also possible to include a brake mechanism adapted for fixating the belt and/or at least one roller upon positioning of the bird.

The type of support surface shown in FIG. 10 is well suited for use as separate support carriers and a series of such carriers may be attached to a common conveyor in substantially the same way as shown for the spreading mechanisms.

Figure 11:
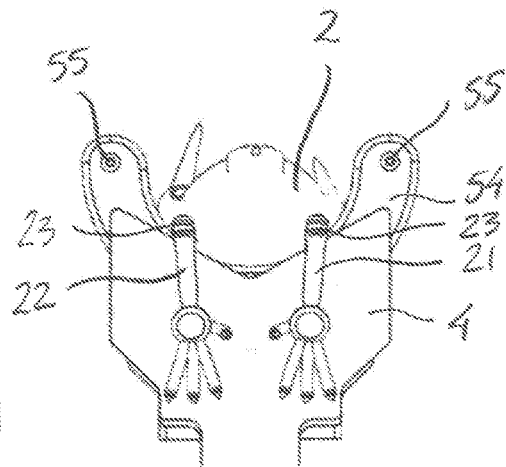
FIGS. 11 and 12 show different stages of operation of the spreading mechanism in FIG. 10 seen from the side as indicated by the arrow XI in FIG. 10, FIG. 13 corresponds to FIG. 12 but seen in a perspective view and also showing a shackle.
Figure 12:
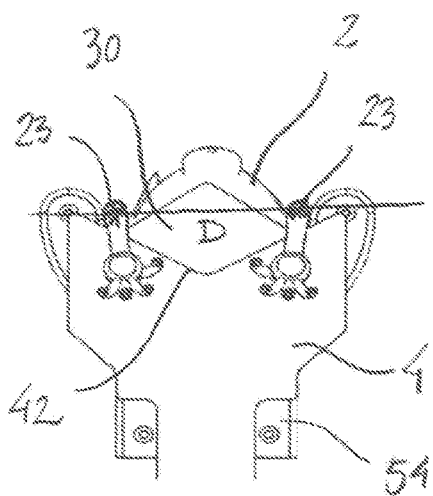
Figure 13:
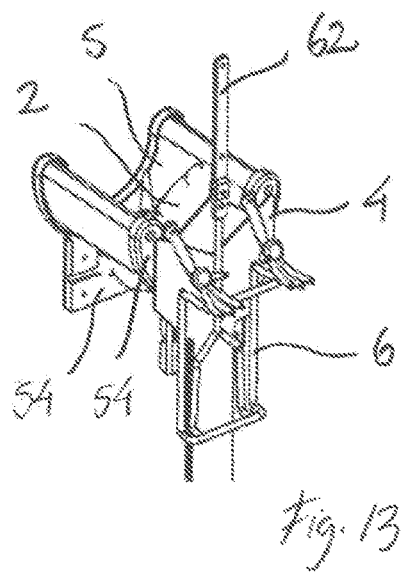
Figure 14:
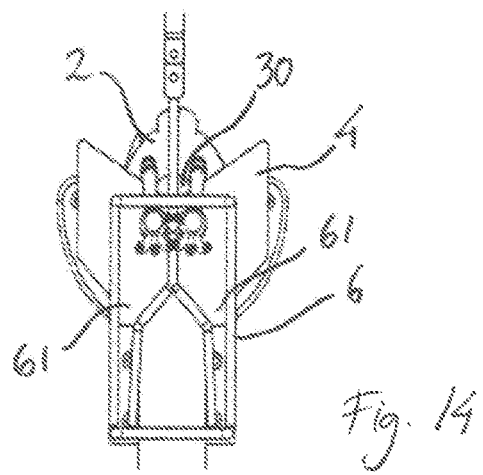
FIGS. 14 and 15 show further stages of operation of the mechanism in FIGS. 10-13 from the same side as in FIGS. 11 and 12, FIG. 16 corresponds to FIG. 10 but showing a different embodiment of the support surface and spreading mechanism.
Figure 15:
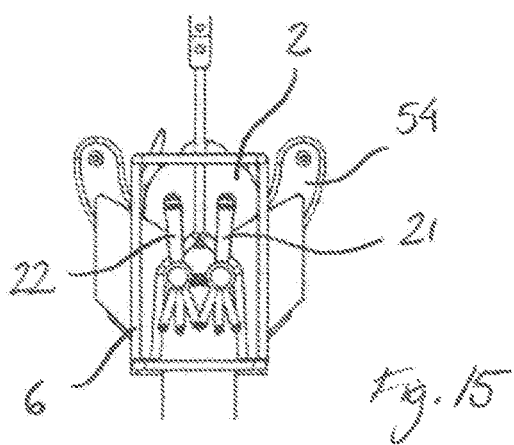

The spreading mechanism 3 in FIGS. 10-15 includes only a single spreading member 30 with a tapering shape. As may be seen in FIGS. 11 and 12, the spreading member 30 is raised from an initial position, where it is almost entirely hidden behind the cover member 4, to a position between the legs 21, 22 of the bird 2. The cover member 4, which has a tapering recess 42, here functions as a restrictor member preventing the legs from coming too far to either side, the spreading member 30 and cover member 4 together forming the shape of a W as described above. The spreading member is moved upwards until the legs have been spread to a position, where the distance D between the hock joints 23 is larger than the distance between the hip joints as described above and the bird thus arranged in the desired position as shown in FIG. 11, corresponding to stage IV in FIGS. 7 and 8. The cover member 4 is then raised to bring the legs back together as shown in FIG. 13, so that they can more easily be inserted in the shackle as shown in FIG. 14, corresponding to stage VI in FIGS. 7 and 8.

FIGS. 16-23 show another embodiment of the spreading mechanism and support surface. In these figures, the same reference numbers as in FIGS. 1-15 have been used and it is to be understood that if nothing else is stated features having the same reference numbers have the same function. It is also to be understood that the arrangement of the different conveyors etc. and possible alternatives described with reference to FIGS. 8 and 9 also applies to this embodiment.

Figure 16:
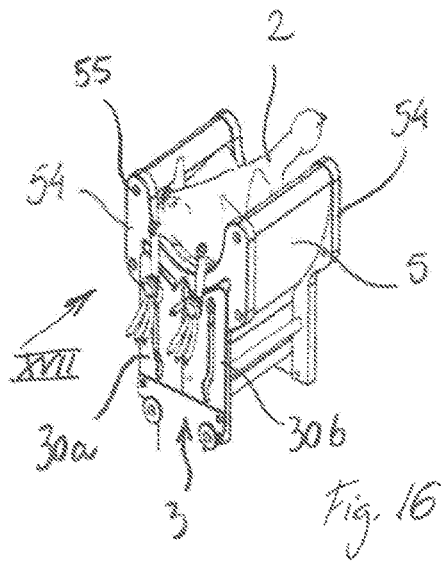
Figure 17:
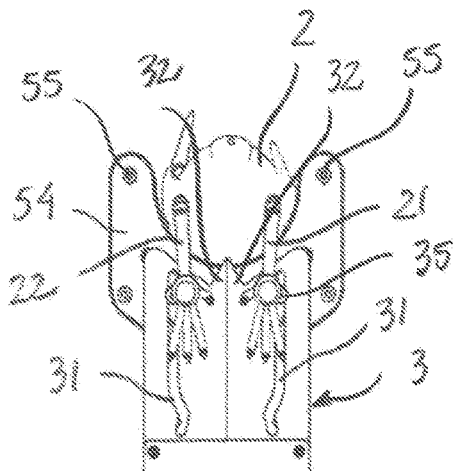
FIGS. 17-19 show different stages of operation of the spreading mechanism in FIG. 16 seen from the side as indicated by the arrow XVII in FIG. 16, FIG. 20 corresponds to FIG. 19 but seen in a perspective view and also showing a shackle, FIG. 21 corresponds to FIG. 20 but showing a further stage of operation of the spreading mechanism.
Figure 18:
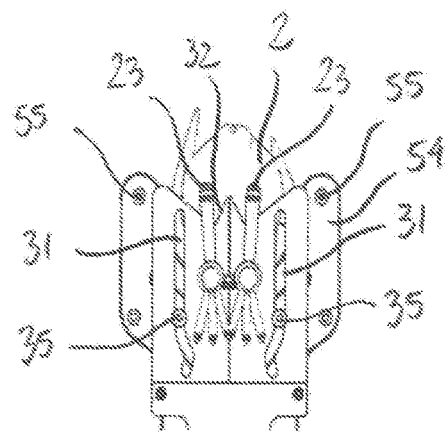

In this embodiment, the support surface resembles that in FIGS. 10-15, except for the concavity being somewhat deeper, and it functions in the same way, while the spreading mechanism 3 includes two spreading members 30a, 30b as in the embodiment in FIGS. 1-9. Here the two spreading members 30a, 30b do not overlap as in FIGS. 1-9 but are mirror images of each other and located in the same plane to form a single unit when arranged close together as shown in FIGS. 16-18. This combined with the fact that there is no cover member, means that the spreading mechanism takes up less space than the one in FIGS. 1-9.

Figure 19:
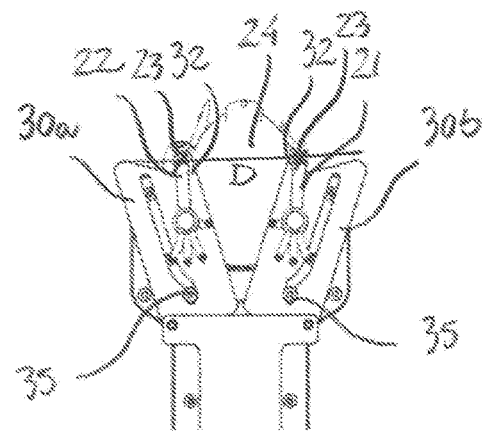
Figure 20:
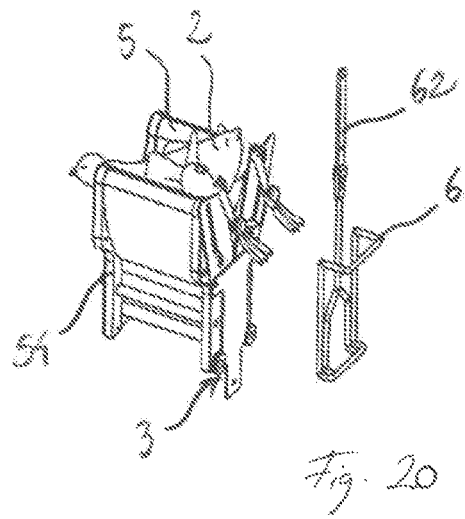
Figure 21:
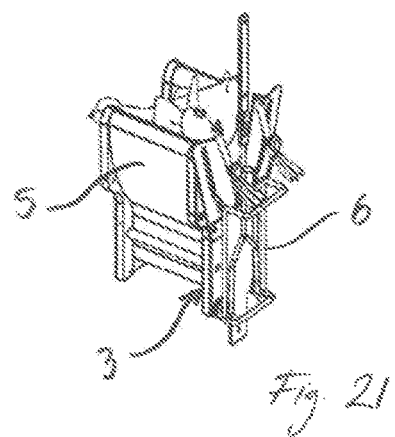
Figure 22:
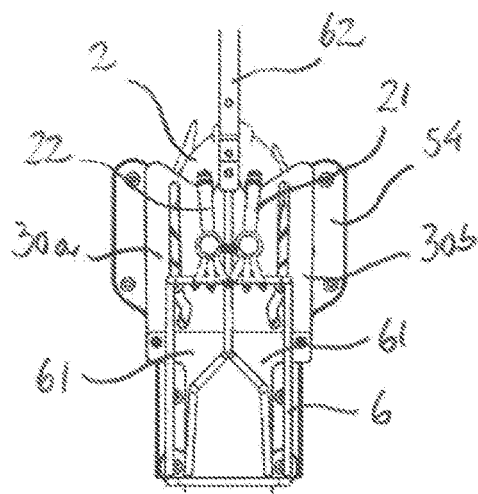
FIGS. 22 and 23 show further stages of operation of the spreading mechanism in FIGS. 16-21 from the same side as in FIGS. 17-19.
Figure 23:
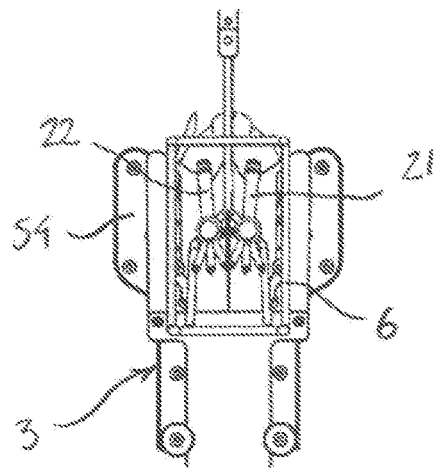

In operation, the tapering sections 32 of the two spreading members 30a, 30b are inserted between the legs of the bird as a unit as shown in FIGS. 17-18. As the tapering sections are here relatively small, this results in the legs initially coming together as shown in FIG. 18, but when the two spreading members are subsequently moved away from each other the legs follow as shown in FIG. 19, thereby increasing the distance D between the hock joints 23 to be bigger than the distance between the hip joints. A restriction of the distance between the legs is achieved by moving the spreading members back together, but keeping them elevated as shown in FIG. 22 thereby bringing the legs into a position suitable for shackling as also shown in FIG. 23.

The movement of the spreading members 30a, 30b is controlled by the interaction between guide tracks 31 in the spreading members and fixed members 35 on a base member of the spreading mechanism when the spreading members are pushed upwards as described with reference to FIG. 9. These fixed members thus serve the same function as the guide projections 41 on the cover member in FIGS. 1-9. Here too it will be understood that the desired pattern of movement may be achieved in other ways.

In the embodiments shown, the spreading members 3 and cover members 4 are all made from sheet metal, but it will be understood that some or all of them may also be made from other materials. As an example, the spreading member or members may be made from bend rod having the same shape as the contact surface of embodiments shown and the same applies to any cover members, particularly when serving as restrictor members.

Above the invention has been described with reference to birds lying with the breast side facing the support surface, but it should be understood that it will in principle also be possible to use it with birds lying on the back even though the physiology of the legs of the bird makes this less efficient. Likewise, it will be understood that the spreading member(s) may be inserted from the back side if design appropriately.

If the bird have been stunned or killed prior to the positioning process they will not resist the positioning, but the method and apparatus may in principle also be used on live and awake birds in which case means could be provided for fixating them on the support surface.

Chicken has been used to illustrate the invention as this is the bird most commonly slaughtered for human consumption, but it will be understood that the method and apparatus may also be used on other kinds of birds, including turkeys, quails, pigeons, ducks and geese.

The invention claimed is:

1. A method of arranging a bird having a body and two legs in a position for being suspended from a shackle, said body having a breast and a back and each leg comprising a breast side, a back side, a thigh connected to the body at a hip joint, a drumstick connected to the thigh, a shank connected to the drumstick at a hock joint and a foot with digits, said method comprising the following sequence of steps:
   I) placing the body of the bird on a support surface with the breast side facing the support surface,
   II) inserting at least one spreading member of a spreading mechanism between the legs of the bird, so that the breast side of at least one leg comes to rest on a contact surface of the spreading member, and
   III) forcing the legs away from each other using the spreading mechanism, so that the distance between the hock joints becomes bigger than the distance between the hip joints.

2. The method according to claim 1, where the contact between the spreading members and the legs cause the body of the bird to be lifted from the support surface.

3. The method according to claim 1, where two spreading members each including a contact surface adapted for contact with one leg of the bird are moved away from each other during step III).

4. The method according to claim 1, further comprising the step of:
   IV) moving the legs back towards each other after completion of step III).

5. The method of suspending a bird from a shackle, where the bird is arranged in a position for being suspended in accordance with claim 4, where upon completion of step III), or step IV) if applicable, the legs are inserted through one or more openings in the shackle.

6. An apparatus for arranging a bird having a body and two legs in a position for being suspended from a shackle, said body having a breast and a back and each leg comprising a breast side, a back side, a thigh connected to the body at a hip joint, a drumstick connected to the thigh, a shank connected to the drumstick at a hock joint and a foot with digits, where said apparatus comprising a spreading mechanism including at least one spreading member adapted for being inserted between the legs of the bird, said spreading member having a contact surface adapted for coming into contact with the breast side of at least one leg during the insertion, and where said spreading mechanism is adapted for forcing the legs away from each, so that the distance between the hock joints becomes bigger than the distance between the hip joints.

7. The apparatus according to claim 6, comprising two spreading members each including a contact surface adapted for contact with one leg of the bird and an activation mechanism adapted for moving the two spreading members away from each other so as to force the legs of the bird away from each other.

8. The apparatus according to claim 6, where the spreading member comprises at least one stop adapted for keeping the legs from coming off the contact surfaces.

9. The apparatus according to claim 6, where the spreading member comprises a tapering section, the narrow end of the tapering section being adapted for being inserted first between the legs of the bird.

10. The apparatus according to claim 6, comprising a restrictor member adapted for moving the legs back towards each other after having been spread, said restrictor member preferably having a tapering recess and being connected to an activation mechanism adapted for advancing the restrictor member towards the legs of the bird so that the legs are forced into the recess and thus gradually towards each other.

\* \* \* \* \*